United States Patent Office 3,651,008
Patented Mar. 21, 1972

3,651,008
POLYMERIC COMPOSITIONS AND THEIR METHOD OF MANUFACTURE
Billy G. Moser, Lake View Terrace, and Robert F. Landel, Altadena, Calif., assignors to California Institute of Technology, Pasadena, Calif.
No Drawing. Filed Dec. 22, 1967, Ser. No. 692,636
Int. Cl. C08g 51/04; C06b 1/04; C08h 17/02
U.S. Cl. 260—37
7 Claims

ABSTRACT OF THE DISCLOSURE

Filled polymer compositions made by dissolving the polymer binder in a suitable sublimable solvent, mixing the filler material with the polymer and its solvent, freezing the resulting mixture, and subliming the frozen solvent from the mixture, removing it therefrom. The remaining composition is then suitable for conventional processing, such as compression molding or extruding. A particular feature of the method of manufacture is pouring the mixed solution slowly in a continuous stream into a cryogenic bath wherein frozen particles of the mixture result. The frozen individual particles are then subjected to the sublimation.

ORIGIN OF INVENTION

The invention described herein was made in the performance of work under a NASA contract and is subject to the provisions of Section 305 of the National Aeronautics and Space Act of 1958, Public Law 85–568 (72 Stat. 435, 42 USC 2457).

BACKGROUND OF THE INVENTION

(1) Field of the invention

This invention relates to the field of polymeric compositions and their method of manufacture. More particularly, the invention relates to compositions utilizing high molecular weight polymers as a binder for selected filler materials, and a particular novel process to achieve the end products.

(2) Description of the prior art

An obvious problem exists in forming highly filled polymer systems. The problem of obtaining well-dispersed filler material in a polymer binder is readily apparent when the polymer material is normally a dry or extremely viscous material. Available mixing techniques do not enable a complete dispersion of the filler material throughout the dry or viscous polymer when high filler content is desired, particularly when the filler material is very finely divided. With thermosetting resins, such as, for example, butadiene, plasticizing aids have to be added in order to decrease the viscosity of the material so that the added fillers can be adequately dispersed. These plasticizers remain in the final cured cross-linked composition. Initially, the temperature normally is raised so as to decrease the viscosity of the composition during the mixing phase. With thermoplastic resinous materials, another conventional process for achieving high filler content has been to form a plastisol or organisol. In these instances, the starting dry polymer is mixed with a material which acts as a solvent for the polymer at elevated temperatures. The filler material and polymer are added together with the solvent to form a suspension. At elevated temperature, the polymer goes into solution in the solvent and forms a gel upon cooling. Once again, the solvent material remains in the final product. In both the foregoing instances, the solid loading capability, that is, the amount of filler to be added, is limited due to the fact that obviously at very high amounts of the dry filler material, the mixture loses its fluidity and ability to be adequately mixed.

In all of the prior techniques the composition in which the filler materials are added cannot be too fluid prior to the curing or the formation of the plastisol since sedimentation would tend to occur and the particles would not be well dispersed in the final product. This often inherently limits the ability to adequately and easily mix the compositions since the viscosities must remain fairly high. Further, since the solvent or plasticizer permanently remains in the polymer, one is limited to the amount used by the desired end properties of the product. Prior attempts have been made to overcome the foregoing problems by utilizing a solvent material for the polymer which can be evaporated therefrom after mixing with the filler materials. However, this has not met with great success, since during the evaporation step of the procedure sedimentation of the filler material in the liquid often results. Additionally, cracking of the polymer product has resulted. Moreover, in some systems it can be extremely difficult to remove the solvent unless the composite is in the form of a thin film.

The aforegoing discussion has been particularly directed to filled polymer systems, since most of the problems are presented in the processing of this class of material. It should be pointed out that the problem of obtaining a workable viscosity for polymeric solutions is most apparent in the coating industry. The coating of cloth, paper, film, the impregnation of fabrics and various products such as wood, paneling, and the like, are accomplished with the utilization of plastisol or organisol solutions. Once again the basic solvent material remains in the final product. It is generally important that there be no solvent action at room temperatures in the preparation of the plastisols which are to be stored prior to use. If solvent action takes place during storage, it can cause an excessive increase in viscosity. Additionally, since the plasticizer or solvent remains in the final product, there is a limit to the control of the viscosity of the overall composition, since one cannot readily choose the amount of plasticizer to be utilized. This is often compensated for by the use of a volatile solvent which serves to thin the material. In such a situation, one now deals with an organisol that has both the plasticizer—a non-volatile solvent—and a volatile solvent which is removed before the final gel is formed. As can be appreciated, the chemistry and the approach to obtain desired viscosities for these compositions is quite complex and often results in a delicate balance between the starting components.

Thus it is an object of this invention to provide a new technique for the processing of high molecular weight polymer materials.

Another object of this invention is to provide a new method of processing high molecular weight polymer materials in a workable fluid form.

One further object of this invention is to provide a new method of utilizing high molecular weight polymers in a liquid form without resorting to the formation of plastisols or organisols.

Still another object of this invention is to provide a new method for forming filled polymer systems.

Still one other object of this invention is to provide new filled polymer products.

SUMMARY OF THE INVENTION

The above and other objects of this invention are accomplished by a new method for converting high molecular weight polymer materials to easily workable or fillable form. By the term high molecular weight polymers reference is had to those materials that have a molecular weight in excess of 10,000. It should be apparent that this invention will apply to polymers of molecular weights considerably below 10,000. However, the basic need for the herein method is not as obvious to the more fluid low molecular weight polymer materials which are normally easily handleable in their normally existing form.

The herein invention utilizes a well known physicochemical technique known as sublimation. The high molecular weight polymer materials are first mixed with a solvent therefor which is capable of sublimation. The viscosity of the mixed material is obviously controlled by the amount of the solvent added to the polymer. Unlike the plastisol compositions, the solvent will serve to form a solution at ambient conditions. After the solution is formed, filler material can be mixed into the material. Alternatively, the fluid composition can be suitably applied or impregnated into desired substances. The next step in the process is the freezing of the formed mixture. This can be accomplished by lowering the material to the freezing point of the solvent. Often for practical purposes it is more feasible to utilize a cryogenic bath. After the solvent has been frozen, the material is then subjected to a chamber maintained at a pressure lower than the vapor pressure of the frozen solvent and at a temperature sufficient to cause sublimation thereof. The material remains in the sublimation chamber for a period of time sufficient to remove all of the solvent from the polymer. After the solvent has been removed, the material is then subjected to the conditions of cure in the case of thermosetting resins, or temperatures sufficient to form the material in the case of the thermoplastics.

As can be easily envisioned, the solvent, when frozen, forms crystalline particles within the matrix material. The sublimation removes essentially these crystals from the product, leaving a relatively porous mass. In most applications it is desirable that the end product not be porous. Thus after leaving the sublimation chamber, the product is most preferably subjected to pressure and temperature causing the remaining material to become compact, filling in the voids left by the sublimed solvent. Where conventional thermoplastic techniques of compression molding, extrusion and the like are involved, these steps will inherently overcome the problem of the voids. As will be shown, the foregoing method is particularly advantageous when dealing with filled polymers. The most critical test of displaying the overall success and usefulness of the foregoing process is demonstrated when forming, for example, solid propellant compositions, wherein it is imperative that the dispersion of the solid oxidizer particles be even throughout the entire composition in order to sustain proper burning.

DESCRIPTION OF PREFERRED EMBODIMENTS

The advantages of the herein disclosed method should be apparent in that one can form the materials utilizing a high molecular weight polymer without concern for deleterious effect of solvents or plasticizers, since none, if so desired, has to remain in the final composition. In the area of the thermoplastic materials that normally have been formed into plastisols or the like, the advantage of the herein invention becomes increasingly obvious in that a thermoplastic product can be formed with all of the inherent advantages in the normal processing such as extruding, compression molding, and the like, without the requirement of forming a gel. Though one of course can apply the method of this invention to polymers of any molecular weight, it is apparent that if the polymer is of a very low molecular weight and is quite fluid, there is generally no reason to add a solvent to cause a greater reduction in viscosity. Thus, for practical purposes, the invention is directed mostly to polymers having molecular weights in excess of 10,000. The polymer materials which may be employed in connection with the novel aspects of this invention are any organic polymer whether naturally occurring or synthetically prepared. Thus, thermoplastic, thermosetting, elastomeric, polymeric, and plastic materials of any description may be employed. These materials may be either naturally occurring, modified materials occurring in nature, or synthetically prepared.

Among the thermoplastic materials which may be employed are polymers and copolymers of mono-olefinic hydrocarbon having at least two carbon atoms. Thus, the polymers and copolymers of ethylene, propylene, various butenes, pentenes, and hexenes, as well as the halogenated counterparts of these olefins may be employed in the practice of this invention. Among the thermosetting polymeric materials which may be employed are those plastics and resins which cure to a solid upon the application of heat with or without a chemical curing agent. Illustrative examples of this class of material include the polyurethane resins, epoxide resins, polyester materials, and di(thioalkoxy) methylene polymers (polysulfide polymers). In addition, elastomers, such as the natural and synthetic rubbers, may be practicably and profitably employed in the practice of this invention. The synthetic rubbers are ordinary polymers and copolymers of a diolefin (as a major constituent) with other olefin constituents and which are subject to vulcanization with sulfur subsequent to polymerization to cross-link the polymer through any remaining carbon-to-carbon double bonds. They may also be rubbers comprised of a copolymer of an olefin and a diolefin in which the diolefin is a minor constituent. In addition to the above, organic polymers derived from naturally occurring non-elastomeric polymeric materials may be employed in the practice of this invention.

In general, carbohydrate condensation-type polymers, amino-acid condensation polymers, synthetic linear condensation polymers including the polyamides and polyesters, linear addition polymers such as hydrocarbon and vinyl-type polymers, and cross-linking polymers may be employed to prepare the products of this invention.

The condensation-type polymers are cellulose, cellulose nitrate, cellulose acetate, cellulose acetate butyrate, ethylcellulose, and the cellulose ethers such as methyl carboxymethyl, hydroxyethyl, cyanoethyl and benzyl cellulose. In addition, such carbohydrate condensation-type polymers as starch, chitin, and formaldehyde polymers may be employed.

Examples of the amino-acid condensation polymers are regenerated proteins such as casein and vegetable globulins. Synthetic linear condensation polymers which may be employed in the practice of this invention include the polyamides such as nylon, and polyurethane resins, polyesters such as the alkyd and fiber-forming types, polyester and polyesteramide rubbers.

Examples of applicable linear addition polymers include natural and vulcanized rubbers such as gutta-percha, balata, and chicle, cyclized or isomerized rubber, rubber hydrochloride, polybutadiene rubbers including GR–S and nitrile rubber, polychloroprene and its copolymers, polysulphide rubbers, polyisobutylene and the butyl rubbers, the various polyethylenes including chloro-sulphonated polyethylene rubber, polystyrene, polyvinylcarbazole and polyacenaphthylene, indene and coumaroneindene resins, polyvinyl acetate, polyvinyl alcohol, polyvinyl pyrrolidone, polyvinyl formal, polyvinyl acetal, and polyvinyl butyral, polyvinyl chloride, vinyl chloride-vinyl acetate copolymers, polyacrylonitrile, vinyl chloride-acrylonitrile copolymers, polyvinylidene chloride and its copolymers, polymethyl methacrylate and related polyacrylates, ketone aldehyde polymers and polyacrylate rubbers.

Cross-lining polymers applicable to the present invention include cross-linking type polyester resins, various epoxy resins, polymerized drying oils, aniline formaldehyde resins, sulphonamide-formaldehyde resins, ureaformaldehyde resins, melamine-formaldehyde resins, and the various phenolformaldehyde condensation resins.

Furthermore, organic polymers containing elements other than carbon, hydrogen, oxygen, and nitrogen may be employed. For example, silicon-containing polymeric materials are advantageously adapted to the practice of this invention. The silicon-containing polymers fall into two general classes; that is, those having direct silicon-to-carbon bonds (the silanes) and those having silicon-bonded to carbon through oxygen (the siloxanes). The silicon-containing materials often have a halogen in the molecule.

Additionally, polymers such as the polybenzimidazole polymers can be utilized. Further, new polymer materials known as block polymers, such as disclosed in U.S. Pat. No. 3,333,024, in both the non-hydrogenated and hydrogenated forms can be used in this invention. The block polymers which are thermoplastic provide excellent binders in compositions such as solid propellants, as will be shown in the specific examples. Further, various fluorocarbon polymers are also contemplated. It should be pointed out that the foregoing list is not necessarily all-inclusive and that the concept of the method of this invention is readily applicable to virtually any polymeric material by one skilled in the art.

The solvent utilized must obviously be a material which will dissolve the chosen polymer. Additionally, the solvent should not form a glass upon being cooled to a solid state. A further requirement is that the solvent be readily sublimable. Examples of conventional solvents which are suitable with many of the various polymers described would include hydrocarbon solvents such as heptane, benzene and naphthalene. Additionally, solvents such as carbon tetrachloride, 1-chloromethylnaphthalene and 1,2-di-chloromethylnaphthalene are contemplated. It should be obvious to one skilled in the art how to choose a solvent material that meets the foregoing requirements. Generally, one will choose a solvent that has solubility parameters that closely match those of the polymer in question.

The filler materials may be in the form of solid particulate particles, mascerated material, fibers, whiskers, and the like. When a solid propellant composition is formed any of the conventional additives such as the perchlorate oxidizers, the nitrates of Groups I–A, I–B and II–B are contemplated, as well as ammonium nitrate. Also contemplated are the various burning rate catalysts in the minor amounts normally used. These catalysts include metal oxides. Powdered metals, such as aluminum, beryllium, lithium, and their hydrides, can also be incorporated in this process. Further, burning depressants such as calcium oxylate and other materials are often used. Where a curing catalyst is necessary, the catalyst will obviously also be added to the composition, though of course it must be of such a nature that it is not removed during the solvent sublimation process.

Further examples of solid fillers include asbestos, glass fibers, carbon black, titanium dioxide, cloth, pigments, antimony trioxide, and the like. One of the most interesting aspects of this invention relates to the utilization of other polymers as solid fillers in a binder matrix. For example, solid polyethylene can be added to styrene, using benzene as a solvent. In the use of one polymer in another, it is apparent that the solvent must selectively dissolve the polymer which will form the matrix while having little effect on the filler polymer. One can thus obtain resultant polymer compositions that have physical or chemical properties that are attributed to a combination of both the matrix polymer and the polymeric material used as filler. While it is preferable that the solvent utilized has no effect on the filler polymeric material, it can be appreciated that a solvent that would work very slowly on a filler polymer will also satisfy the purpose of this invention. For example, in this situation, the mixture of the dissolved polymer matrix material in the solvent and the filler polymer material would be quickly added to the cryogenic bath before the filler polymer would be significantly dissolved.

Another unusual aspect of this invention is the possibility to add and incorporate liquids in solid polymeric material. For example, solid frozen beads of an oil could be added to the dissolved polymer solution and mixed therewith. Upon subliming the solvent from the material and forming the matrix polymer to a solid state, the oil which would melt at the elevated temperatures, would be incorporated in situ in the resultant product.

One of the particular advantages of the method of this invention is the ability to achieve high loading of solid particulate particles in a polymer matrix or binder heretofore unobtainable. The inherent limitation was the amount of solid particulate particles that could be added to the composition before it would become dry and not readily mixable or flowable. In other words, there would not be enough polymer solution to cover the filler. This could not be corrected by adding more plasticizer or solvent, since the end product would contain too little polymer to have useful properties. In the instant invention, it should be apparent that this maximum can be exceeded in that the solvent, which is all removed from the final product, can be present in such an amount so as to enable the mixing of a liquid material regardless of the amount of particulate matter. In fact, utilizing the method of this invention the polymeric material can be present in such a small amount that it would merely serve to bind adjacent particles together but not necessarily be a continuous matrix throughout the resulting composition. Prior processing techniques could not readily achieve this result.

From the aforegoing discussion, it is apparent the process of this invention does not require the use of solvents or plasticizers which remain in the final product. However, there are situations where such materials are needed to give desirable properties to the end product, though they are not needed as processing aids. Thus, the herein invention further contemplates the addition of non-volatile, non-sublimable solvents and plasticizers in amounts sufficient to achieve sought-after properties in the final product. For example, material such as mineral oil can be added to the starting composition in addition to the sublimable solvent in order to give increased elasticity to the final product. Other materials that could be so added include conventional plasticizers and/or gel-formers such as dibutyl phthalate, dioctyl sebacate, tricresyl phosphate, the various rubber extender oils such as cumar resin and Para-flux, camphor, Circosol, and the high-boiling Cellosolves.

In practicing the process of this invention, it is apparent that the mixed or filled polymer must be frozen prior to possible sedimentation of the filler material. The rate of sedimentation of the filler can be of course controlled by the amount of solvent added to the polymer so that the resulting viscosity of the material being mixed is regulated. The more viscous the prefrozen material is, the slower the rate of sedimentation. A very viscous material thus could be mixed and submerged as an entire mass in a suitable cold bath of a cryogen such as liquid nitrogen. The walls of the mixing vessel can be provided with coils through which a coolant can flow to freeze the material in situ within the mixing container. Alternatively, the mixed material can be contained in a plastic bag or container which would be subsequently submerged in a cold bath. However, when freezing an entire mass of mixed material, there is obviously a problem in obtaining a rapid sublimation of the solvent material from, for example, the center of the mass outward through the porous structure. Though all of the solvent can be sublimed from a relatively large solid mass so formed, the length of time for this operation is extended. Thus, a preferred way of freezing a material of this invention prior to the sublimation is to pour or spray the mixed material directly into a cold bath so that the mixed material will freeze upon impact therewith into small particles. Thus the sublimation of the solvent would be from relatively small masses of material, greatly speeding up its removal. Further, it is often easier to work with and handle the small formed particles of the filled polymer. Each particle, as can be appreciated, will have evenly dispersed therein the filler material. The dry sublimed particles can then be easily fed to conventional molding or compression equipment to be compacted into masses of desired form. With thermoplastic binders the compression molding or extrusion will serve both to rid the material of the voids left by the sublimed solvent and form it into a final useable product. With thermosetting resins, a compaction step is required to rid the material of the void left by the solvent. This compaction step then would be followed by a conventional curing at a given time and temperature to achieve the cross-linking of the binder. A partial compaction can lead to the preparation of a porous, foam-like material, if desired.

The cooling bath should be of a temperature sufficient to cause virtually instantaneous freezing of the solvent material. The main criteria is to achieve freezing of the solvent. Often, at the low temperatures used, the polymer will additionally freeze. However, the freezing of the polymer is incidental to the process and not required. Thus, the requirements for the bath temperature will depend upon the solvent utilized. If a liquid ice water bath is used, the material would be filtered or strained off of the bath after reaching its frozen state. If a cryogenic bath is used, such as liquid nitrogen, the material together with the bath could be placed in the sublimation chamber so that the bath material would be evaporated in the same operation with the solvent sublimation. Alternatively, of course, even with a cryogenic bath the material can be filtered or strained from the bath and carried into the sublimation chamber without the bath material. As previously indicated, the sublimation chamber will be at a temperature at which the solvent will readily sublime. It is not necessary, generally, to lower the temperature of the sublimation chamber during the drying, since the loss of heat from the material as the solvent sublimes is sufficient to keep the solvent in a solidly frozen state. The pressure of the sublimation chamber is naturally lower than the vapor pressure of the solvent at the temperature of sublimation.

To demonstrate the usefulness of the novel process, solid propellant compositions were made and tested. One reason for choosing the solid propellant composition as a vehicle for the invention is that firstly the filler materials are in extremely fine form and often difficult to adequately disperse in viscous polymers such as this invention discusses. Secondly, the test firing of a sample formed is a good indication as to the adequacy of the dispersion of the solid material in the filler, as well as indicating the overall properties of the end product. Any inconsistencies in the formed propellant grain or lack of adequate dispersion of the oxidizer particles will readily disclose itself during a test firing. The binder material utilized in the following examples was a block polymer having the general configuration of A-B-A wherein A is styrene and B is butadiene. The block polymers are disclosed in U.S. Pat. No. 3,333,024. Though that patent was particularly directed to the hydrogenated version, in the following examples it is pointed out that the non-hydrogenated block polymers were utilized.

It is believed the invention will be further understood from the following detailed examples.

EXAMPLE I

In this formulation of a dummy solid propellant, Kraton 101, a block styrene-butadiene polymer manufactured by Shell Chemical Company, was utilized as the polymer binder. This material is delivered as relatively rubbery pellets, and thus could not be readily mixed with fillers to obtain a homogeneous dispersion. 120 grams of Kraton 101 was dissolved in 1,200 grams of benzene which acted as a solvent for the polymer. The polymer and solvent were added in an Ehrlenmeyer flask. To the mixture there was added 480 grams of ammonium sulphate in solid particulate form. The simulated oxidizer (ammonium sulphate) was a bimodal blend consisting essentially of 70 weight percent of 100 micron mean weight diameter particles, and 30 weight percent of approximately 12 micron mean weight diameter particles. Mixing of the ammonium sulphate in solution of polymer in benzene was effected by a magnetic stirrer, with the flask sealed. The mixing was continued for 5 to 10 minutes until the ammonium sulphate oxidizer was thoroughly dispersed. Immediately upon completion of mixing, the solution was poured in a continuous stream into a bath of liquid nitrogen. The liquid nitrogen was in a Teflon-lined container which could easily be transported to a sublimation chamber. Upon the stream of mixed material contacting the liquid nitrogen bath, small individual particles of frozen solvent, with polymer and ammonium sulphate dispersed therein, were formed. The bath with the formed particles was then transported to a vacuum chamber which was at room temperature. The pressure in the vacuum chamber was about 28 inches of mercury. The liquid nitrogen evaporated as the pressure was decreased, leaving solid frozen particles of the polymer containing the ammonium sulphate dispersed therein. The polymer particles then remained solidly frozen due to the great loss of heat from the sample as the solvent sublimed. After 2 to 3 hours, the benzene had completely sublimed. The end of the sublimation was readily noted by observing the increased vacuum shown on the vacuum gauge or by noting that there was no smell of benzene over the sample. The material was then inserted in a Teflon lined cylindrical compression mold and a ¼" x 4" rod of propellant was formed. The temperature of the compression mold was 320° F. The pressure was about 1,000 p.s.i., while the time of molding was one hour. The resultant product had an 80% loading of the ammonium sulphate which appeared to be uniformly dispersed throughout the specimen.

EXAMPLE II

The procedure of Example I was repeated. However, in this example, the mixture comprised 40 grams of Kraton 101, 144.3 grams of benzene and 1600 grams of ammonium perchlorate as the oxidizer. The ammonium perchlorate was also a bimodal blend having the same size distribution as the ammonium sulphate in the previous example. The molding in this case was in ¼" thick flat sheets and was achieved at 320° F. at 600 p.s.i. for 1 hour and 10 minutes. This resulted in a composition having an 80 weight percent loading of the ammonium perchlorate. The burning rate of specimens cut from the sheet was measured in a conventional Crawford bomb strand burner. Sustained, even burning was obtained, indicating adequately formed propellant. The average burning rate obtained was 0.5 in./sec. at 1,000 p.s.i. nitrogen pressure in the bomb.

EXAMPLE III

To form a product of one polymer dispersed in another, 20 grams of polystyrene pellets of about ⅟₁₆ inch diameter by about ⅛ inch long were added to 135 grams of benzene as a solvent therefor. The material was mixed in a magnetic stirrer for about 2 hours, at which time a solution was obtained. To this solution was then added 20 grams of 30 micron diameter polyethylene spheres. Since the polyethylene was not soluble in benzene, the resulting mixture became a slurry of one polymer in a solution of the other. Mixing continued for 10 minutes, at which time dispersion was complete. The mixture was frozen by pouring it into a bath of liquid nitrogen. This resulted in small, irregular shaped particles of about ¼ inch diameter or less. The excess liquid nitrogen was poured off and the frozen particles placed in a vacuum chamber at room temperature and 28 inches of mercury pressure. The resulting solvent-free particles were then pressed into a truncated cone at 390° F. and between 1500–2000 p.s.i. The resulting shaped product was void free and had solid polyethylene particles dispersed in a polystyrene matrix.

It should be reiterated that though the particular examples were with regard to the formation of solid propellants to demonstrate the degree of dispersion that can be obtained and the adequacy thereof, this invention is equally applicable to forming any polymer product. As indicated, even thin films of polymer can be formed incorporating plasticizers in the final composition if desired, to provide coatings for material such as fabrics, wood, and the like. Additionally, high strength articles of manufacture having strengthening fillers therein can be readily formed through pressure molding and extruding, utilizing the filled polymers resulting from the process of the invention. Another useful product contemplated is in the field of explosives where extremely high loading of the active ingredients in a binder can now be readily achieved.

While the polymeric compositions and their method of manufacture of this invention have been described in detail, it is to be clearly understood that this is intended by way of illustration and example only and is not to be taken by way of limitation, the spirit and scope of this invention being limited only by the terms of the following claims.

What is claimed is:

1. A method of producing filled polymers comprising:
   dissolving a polymer in a sublimable solvent therefor,
   adding a filler to said dissolved polymer,
   lowering the temperature of the mixture of said dissolved polymer and filler to at least the freezing point of said solvent,
   and subliming said solvent from said mixture.

2. The method of claim 1 comprising freezing said mixture into small particles by pouring said mixture into a cold bath.

3. The method of claim 1 further comprising:
   compacting said mass after sublimation of said solvent to rid said mass of voids remaining from sublimed solvent.

4. The method of claim 3 further comprising:
   subjecting said mixture to conditions sufficient to form said polymer into a solid cohesive mass.

5. The method of claim 4 wherein said polymer is thermoplastic and further comprising:
   subjecting said mixture to a conventional thermoplastic forming operation whereby said mixture is simultaneously compacted and formed into a solid cohesive mass.

6. A method of producing filled polymers comprising:
   dissolving a polymer in a sublimable solvent therefor, such that said polymer goes into solution at ambient temperature,
   adding a filler to said dissolved polymer,
   mixing said filler in said dissolved polymer to thoroughly disperse it therein,
   lowering the temperature of the mixture of said dissolved polymer and filler to at least the freezing point of the entire mixture,
   and subliming said solvent from mixture.

7. The method of claim 6 wherein said polymer is thermoplastic and said filler comprises particulate matter sufficient to form a solid propellant composition.

References Cited

UNITED STATES PATENTS

| | | | |
|---|---|---|---|
| 3,449,179 | 6/1969 | Menekawa et al. | 149—92 |
| 3,520,742 | 7/1970 | Witz | 149—19 |
| 3,285,865 | 11/1966 | Bene et al. | 260—897 |
| 3,398,215 | 8/1968 | Spenadel et al. | 149—19 |
| 3,410,392 | 11/1968 | Hermanson | 260—897 |
| 3,419,445 | 12/1968 | Markels, Jr. | 149—19 |
| 2,353,991 | 7/1944 | Boutwell | 106—198 |
| 2,701,211 | 2/1955 | Taylor et al. | 106—198 |
| 2,868,663 | 1/1959 | Jarmus | 106—198 |

OTHER REFERENCES

Perry, Chemical Engineer's Handbook, 3rd edition, TP 155 p. 4, pages 660–663 relied on.

MORRIS LIEBMAN, Primary Examiner

U.S. Cl. X.R.

106—193 R, 193 M; 149—19; 260—37 EP, 37 M, 37 N, 38, 39 R, 39 M, 40 R, 41 R, 41 B, 41 AG, 415 R